No. 851,168. PATENTED APR. 23, 1907.
W. M. HOTZE.
STOCK FOUNTAIN.
APPLICATION FILED JAN. 20, 1905.

Witnesses,
K. K. Keffer
J. B. Smutney

Inventor, Wm. M. Hotze
by Orwig & Lane Attys.

UNITED STATES PATENT OFFICE.

WILLIAM M. HOTZE, OF CARSON, IOWA.

STOCK-FOUNTAIN.

No. 851,168.

Specification of Letters Patent.

Patented April 23, 1907.

Application filed January 20, 1905. Serial No. 241,943.

*To all whom it may concern:*

Be it known that I, WILLIAM M. HOTZE, a citizen of the United States, residing at Carson, in the county of Pottawattamie and State of Iowa, have invented a certain new and useful Stock-Fountain, of which the following is a specification.

The objects of my invention are to provide a stock waterer which is adapted for use where hogs and chickens and other smaller animals can have access at the same time that cattle and horses are using, and to provide a fountain beneath which a lamp can be placed and easily and readily kept burning to prevent water in the troughs from freezing, and further to provide means for automatically shutting off the water supply from the cattle tank and also from the hog waterer.

My invention consists in certain details, in the construction, arrangement and combination of the various parts of the device, whereby the objects contemplated are attained, as hereinafter more fully set forth, pointed out in my claim and illustrated in the accompanying drawings, in which—

Figure 1:
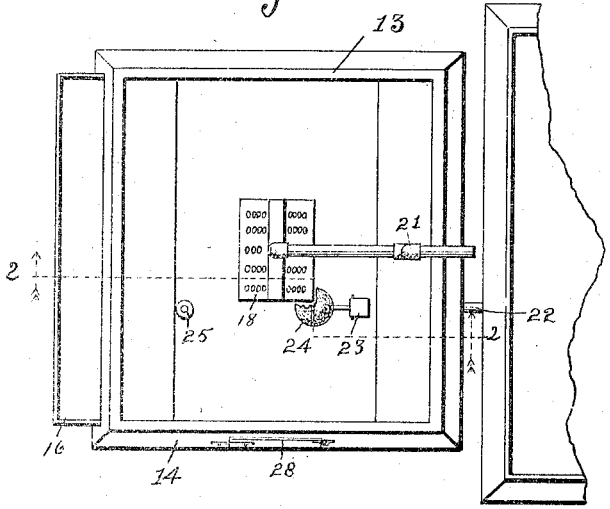
Figure 2:
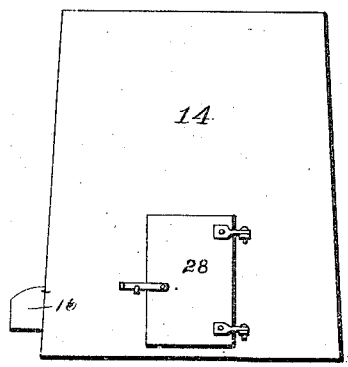
Figure 3:
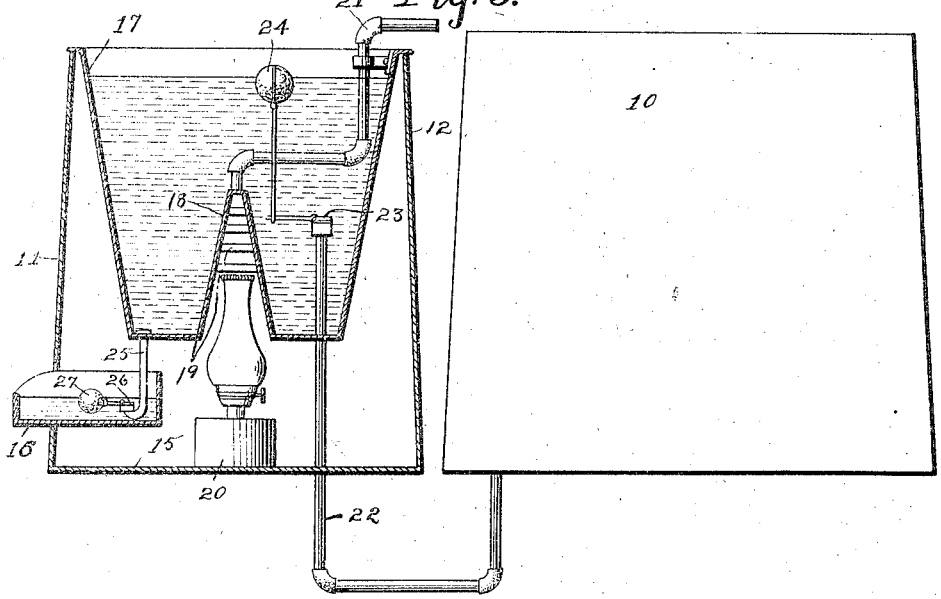

Figure 1 is a plan view of the device, showing a portion of the supply tank for the water. Fig. 2 is an end view of the trough showing the door for obtaining access to the lamp which is to be mounted adjacent to these troughs, and Fig. 3 is a longitudinal sectional view of the trough taken on the line 2—2 of Fig. 1.

Referring to the accompanying drawings, I have used the reference numeral 10 to indicate the supply tank from which the water is fed into my trough. I have provided a casing consisting of the front portion 11, the rear portion 12 and the end portions 13 and 14. I have also provided a bottom 15 connecting the parts 11, 12, 13 and 14. In the front portion 11 I have provided an opening through which a small trough 16 extends so that a portion of said trough is on the interior of the casing and on the inside of the front 11 of said casing, and a portion of said trough 16 is on the outside of said front 11. Detachably mounted in the part 11 and being substantially within the casing is the trough 17 which is supported on the portions 11, 12, 13 and 14. I have provided a V-shaped portion 18 in the central part of the bottom of the trough 17, and extending across the upper portion of the V-shaped portion 18 is a series of transverse pipes 19 so that the water will run freely from one side of the V-shaped portion to the other side of it through these pipes 19. The sides of the trough 17 extend downwardly and inwardly from their points of contact with the frame as shown clearly in Fig. 3 of the drawings. Mounted beneath the V-shaped portion 18 and directly under the pipes 19 on the bottom 15 is a lamp 20 designed to keep the water in the troughs 16 and 17 from freezing. Attached to the upper end of the V-shaped portion 18 is a pipe 21, which pipe is fastened to the upper portion of the trough 17 and extends a slight distance above it. It is through this pipe 21 that the gases from the lamp are designed to pass off. Connecting the supply tank 10 with the trough 17 is a supply pipe 22 having the valve 23 on that upper end of it which is inside of the trough 17. Connected with this valve 23 is the ordinary float 24, so arranged and constructed that when the water reaches a certain predetermined height in the trough 17, the supply will be shut off on account of the float 24 being raised by the water and causing the valve 23 to be closed. When the water is below a certain level, the valve 23 will be swung to an open position and will remain in that position until closed automatically by means of the float 24.

Connecting the lower portion of the trough 17 with the trough 16 is a pipe 25 having a valve 26 adjacent to its lower opening, said valve having the float 27 attached to it so that when the water in the trough 16 reaches a certain predetermined height, the supply of water from the trough 17 to this trough will be shut off. In the end 14 of the casing is a door 28 so arranged that access may be easily had to the lamp when necessary.

In practical use it will be seen that the water troughs 16 and 17 will be constantly filled with water from this supply tank and the water in these troughs will be maintained at a certain predetermined height constantly and when this height is reached, the supply will be shut off automatically by the water coming from the supply tank.

It will also be seen that spaces are afforded in the casing, between the side walls thereof and the side walls of the trough 17, which spaces will be occupied by hot air and will assist materially in preventing freezing of the water in the trough.

I claim:

In a stock fountain, the combination of a casing having an opening in the lower portion of its front wall, a lamp arranged in the casing and resting on the bottom thereof, a trough arranged in and closing the top of the casing and having its bottom wall and side walls so arranged relative to the bottom and side walls of the casing that spaces are formed between said walls of the trough and casing, and also having an upwardly extending central portion receiving the chimney of the lamp, a second trough extending forward through the opening in the front wall of the casing and having its rear portion arranged in the casing between the lamp and the front wall of the casing and also between the bottom walls of the casing and the first mentioned trough, a conduit connecting the first and second mentioned troughs, and a float-valve arranged in the second mentioned trough and controlling the passage of water through said conduit.

WILLIAM M. HOTZE.

Witnesses:
CLAUDE CATER,
D. W. WHITE.